United States Patent [19]

Cross

[11] Patent Number: 4,493,748

[45] Date of Patent: Jan. 15, 1985

[54] PROCESS OF MAKING RAISED LINE IMPRINTED DISPLAY MOUNTS

[76] Inventor: Carroll N. Cross, Rte. 2, Box 741, Maitland, Fla. 32751

[21] Appl. No.: 568,814

[22] Filed: Jan. 6, 1984

[51] Int. Cl.$^3$ .............................................. B32B 31/20
[52] U.S. Cl. ........................................ 156/79; 40/616; 156/220; 156/233; 428/159; 428/318.6; 428/913.3
[58] Field of Search .................. 156/78, 79, 209, 233, 156/220; 428/159, 318.6, 913.3; 40/616

[56] References Cited

U.S. PATENT DOCUMENTS 4,022,943  5/1977  Erb et al. ............................. 428/159
4,273,820  6/1981  Swietzer ............................... 428/159
4,274,236  6/1981  Kessler ............................. 428/159 X

*Primary Examiner*—Robert Dawson
*Attorney, Agent, or Firm*—William M. Hobby, III

[57] ABSTRACT

A process of making raised line imprinted display mounts utilizing a foam polymer sheet having a thin polymer laminate covering includes the step of selecting a foam polymer sheet having a thin polymer laminate covering. The laminate covering surface is foil stamped with a die under predetermined pressure at predetermined temperatures and for elected dwell time to produce a raised line imprinted lettering or designs on the surface resembling an embossed surface stamping.

8 Claims, No Drawings

PROCESS OF MAKING RAISED LINE IMPRINTED DISPLAY MOUNTS

BACKGROUND OF THE INVENTION

The present invention relates to a method of imprinting on a surface which produces a raised line imprinted lettering or design on a lightweight foam polymer material having a thin polymer laminate covering.

In the past, it has been common in the manufacture of display mounts for calendars, and the like, to provide printing on the surface of the mounts as well as on the calendar pads including conventional lithographic printing with inks. It has also been common to foil stamp display mounts, especially with gold foil stamping, which requires the feeding of a roll of colored foil paper material through a heated die and applying the heated die against the foil stamping material and against the surface being printed upon to transfer foil stamped letters or designs to the surface of the display mount board.

In a typical foil stamping operation, the board is under pressure so that there is a slight indentation in the surface, especially of soft materials, but the foil stamping can produce a desirable printing resembling gold leaf. In the art of display mounts, it has become common in recent years to seek ways to reduce the weight of the display mount and calendar pads because of the substantial increase in postage rates. Display mounts for displaying calendars are provided through various companies as part of the company's advertising, as well as through sales to the public, which requires the mailing of individual calendars. If the calendar weight can be kept within one ounce, it can then be mailed first class with one stamp. Prior display mounts, however, use heavy paperboard which is casebound in two or three layers to provide a pocket for the calendar. This increases the weight substantially and required an increase in postage. With the new postal rates, however, several techniques for reducing postage have been proposed, one of which has been to make display mounts of a foamed polymer material such as a foamed polystyrene having a surface laminate of polystyrene which does not require casebinding and which is light in weight but sufficiently strong to allow display mounts to be made with lower weight. This material can be printed on but is sensitive to heat and pressure, which destroys the laminate.

The present invention is directed towards a method in which the use of predetermined pressures, temperatures and dwell times for different colors of foil stamping on a laminate cover foamed polymer material will press the material but will produce a swelling directly under the foil coating or heated die to produce a raised letter effect and a substantially improved appearance of the imprinted material.

Typical display mounts for calendar pads and the like may be seen in my prior U.S. Pat. No. 2,355,706 for a display mount having a well in the face thereof for displaying material such as calendar pads and in U.S. Pat. Nos. 3,058,410 and 3,079,715 for an improved display mount structure and improved method for forming the display windows and display wells and display mount structures. In addition, my prior patents on display and photo mounts can be seen in U.S. Pat. No. 3,216,582; U.S. Pat. No. 3,068,139; and U.S. Pat. No. 3,002,720, which includes my patent on an aluminum hinge which allows a supporting prop or other display mount supports to be mounted with a flexible hinged panel which stays in place without the use of interconnecting tongues. Additional display mounts may be seen in my prior U.S. Pat. No. 4,285,683 for a method of making a display mount; U.S. Pat. No. 4,199,883 for a display mount; U.S. Pat. No. 4,326,906 for a display mount and method; U.S. Pat. No. 4,263,733 for a display mount with protected thermometer; U.S. Pat. No. 4,299,643 for a method of making a hinged display mount; U.S. Pat. No. 4,288,935 for a display book apparatus; and in U.S. Pat. No. 4,351,123 for a display mount and method. The present invention has the aim of providing an improved method of imprinting upon a foamed polymer sheet having a polystyrene laminate surface on one or both sides.

SUMMARY OF THE INVENTION

The process of making a raised line imprinted display mount includes the step of first selecting a foam polymer sheet having a thin polymer laminate covering, such as a foamed polystyrene sheet covered with a polystyrene laminate surface on one or both sides. The foamed polymer sheet laminate covering is foil stamped with a die under a predetermined pressure at a predetermined temperature and for a predetermined dwell time to produce a raised line imprinted lettering or design. The preferred pressures vary from 20 pounds to 50 pounds of pressure, depending on the foil color, with the preferred temperature varying from 325° F. to 375° F. and the pressure varying from 1/10 of a second to 1/5 of a second, for foil colors of blue, red, green, brown, gold and black.

Other objects, features and advantages of the present invention will be apparent from the written description and the claims.

DESCRIPTION OF THE PREFERRED EMBODIMENTS

The present invention relates to a method of making a raised letter or a raised design imprinting on display mounts, or the like, on foam polymer sheet materials having a polymer laminate surface. The first step involves the selection of material, including a rigid foamed polystyrene polymer sheet having a polystyrene laminate surface on both sides which is produced in different thicknesses. The polystyrene sheet with a laminate surface may be die-cut at this time or may be foil stamped and die-cut at a later step. The foil stamping includes a foil stamping machine having more accurate control of temperature and pressure than that I have been able to accomplish with a mechanically driven foil stamping machine. A direct air actuated foil stamping machine is utilized which cyclically feeds foil stamping material from a reel across the surface to be stamped. The cyclically actuated die is preheated to a predetermined temperature against the foil stamping color foil for a predetermined dwell time under a predetermined pressure. In addition to lettering, zinc or brass dies can be produced for imprinting a design or logo onto the surface of the foamed polymer material. Inasmuch as the foamed polymer material and the laminate are sensitive to heat and pressure, foil stamping has not been utilized on this type of material previously under the conditions to produce raised letters or configurations.

I have found that foil stamping with precise pressures, temperatures and dwell times for different foil colors produces not a depressed, damaged surface, but a raised lettering effect giving a very desirable imprinting on the surface. The following table shows variations for each foil color as has been determined to operate with a rigid polystyrene foam sandwiched between two cap sheets of white, translucent styrenic polymer surface. Additional heats or pressures much in excess of those provided will ruin the material causing the laminate surface to stick to the die, while pressures and temperatures much lower than those provided will not be sufficient to foil stamp the foil color onto the surface of the laminate.

| Foil Color | Dwell Time | Heat | Pressure |
| --- | --- | --- | --- |
| Blue | .1 Seconds | 350 | 30 lbs. |
| Red | .1 Seconds | 375 | 50 lbs. |
| Green | .2 Seconds | 350 | 30 lbs. |
| Brown | .1 Seconds | 350 | 40 lbs. |
| Gold | .1 Seconds | 325 | 20 lbs. |
| Black | .2 Seconds | 360 | 30 lbs. |

As can be seen from the table, ideal temperatures vary from 325° F. to 375° F., while ideal pressures vary from 20 pounds to 50 pounds and dwell time varies from 1/10 of a second to 1/5 of a second. However, the process can be performed with some variation so that the dwell time can be allowed to remain constant by slight adjustments to the pressure and heat, and similarly, slight adjustments in the heat or pressure can be offset by the dwell time, heat or pressure. It is believed that the desired raised lettering effect is provided by the swelling of the foamed polymer beneath the laminate surface at the desired heat and pressure, but the pressure initially indents the surface and then expands as it cures directly under the foil color surface where the heat and pressure have been applied. The process thus includes the making of a die or lettering for the foil stamping, the obtaining of a foil stamping machine which can operate within the tolerances necessary for the foil stamping of the material without damaging the material. The material is usually cut before stamping to form the display mounts. The calendar pads, or the like, can be attached with conventional equipment by stapling the pads to the material. This method uses standard type of 8, 10 and 12 point or border designs or other designs formed in dies with a short dwell time of 1/10 to 3/10 of a second to produce a reaction to the partially expanded rigid but soft foamed polymer center and to the more rigid thin laminate to produce sharply defined raised letters and designs on the surface once subjected to the appropriate heat and pressure only at the points of contact.

The desired operating range is believed to be 325° F. to 375° F. under pressure from 20 pounds to 50 pounds and a dwell time between 1/10 to 1/5 of a second. However, the process is believed to be operable with a slightly broader range including from 300° F. to 400° F., from 20 to 60 pounds of pressure, and from 1/10 to 3/10 of a second dwell time. The present method is not to be considered as limited to the forms described which are to be considered illustrative rather than restrictive.

I claim:

1. A process of making raised line imprinted display mounts comprising the steps of:
   selecting a foam polymer sheet having a thin polymer laminate covering; and
   heat stamping the laminate covering surface of said foam polymer sheet with a heated die surface under a predetermined pressure and at a predetermined temperature to produce a raised surface stamping of the heated die surface on the laminate covering.

2. A process in accordance with claim 1, in which the step of heat stamping the surface includes foil stamping for a predetermined dwell time.

3. A process of making raised line imprinted display mounts in accordance with claim 2, including the step of foil stamping under a pressure between 20 and 50 pounds.

4. A process of making raised line imprinted display mounts in accordance with claim 3, in which the step of foil stamping includes foil stamping at a temperature between 325° F. and 375° F.

5. A process of making raised line imprinted display mounts in accordance with claim 4, in which foil stamping is for a dwell time between 1/10 and 3/10 of a second.

6. A process of making raised letter display mounts in accordance with claim 5, including the step of die-cutting the imprinted foil stamped material for assembling into a display mount.

7. A process of making raised line imprinted display mounts in accordance with claim 1, including the selecting of a foamed polymer sheet of rigid polystyrene having a styrenic polymer covering.

8. A process of making raised line imprinted display mounts in accordance with claim 7, in which the step of foil stamping includes foil stamping a gold foil color onto a laminate covering surface of a foam polymer sheet under a pressure of approximately 20 pounds at a temperature of approximately 325° F.

* * * * *